May 18, 1965 R. P. ROSS 3,183,865
REFRACTORY ARCH FURNACE ROOF
Filed March 8, 1962 2 Sheets-Sheet 1
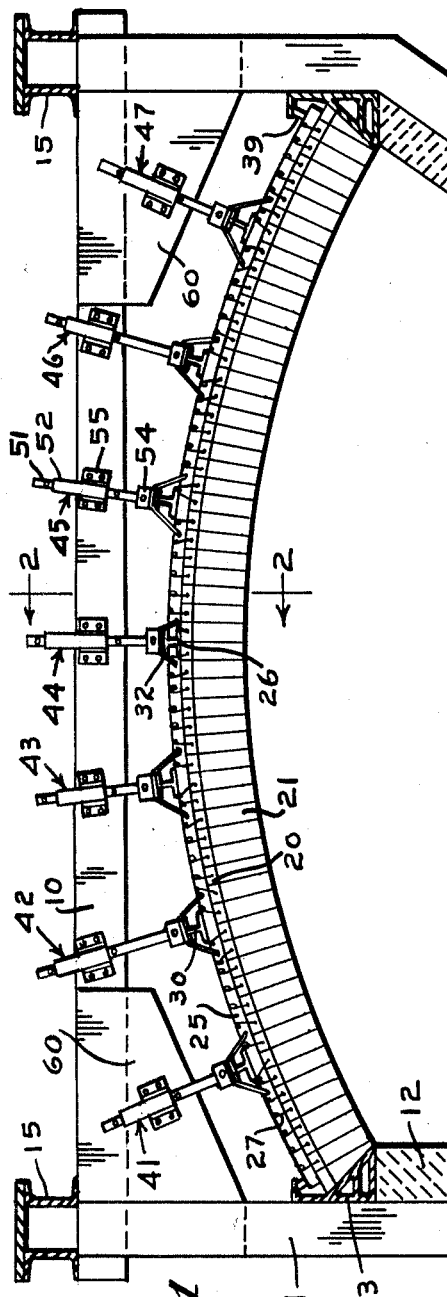
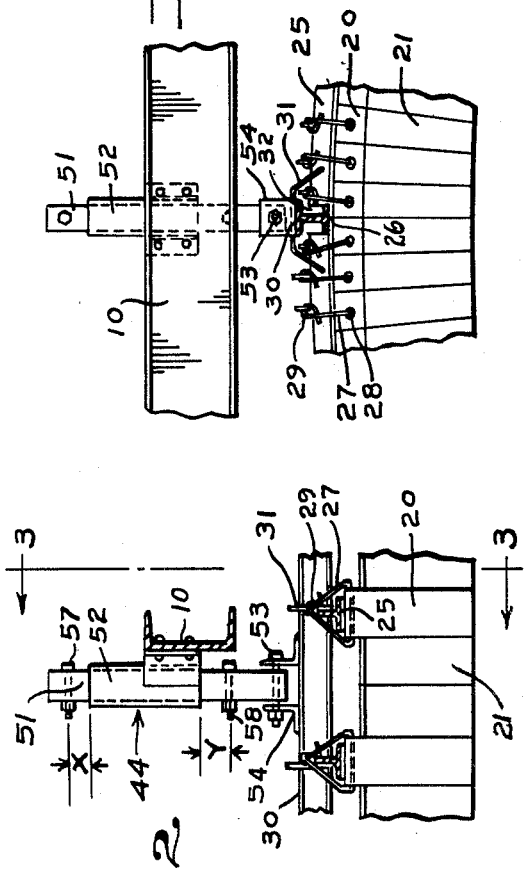
INVENTOR.
ROBERT P. ROSS
BY
Clarence R. Patty, Jr.
ATTORNEY May 18, 1965 R. P. ROSS 3,183,865
REFRACTORY ARCH FURNACE ROOF
Filed March 8, 1962 2 Sheets-Sheet 2
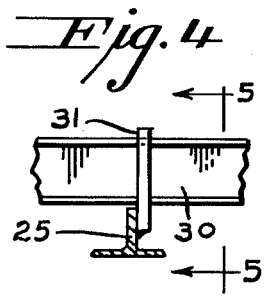
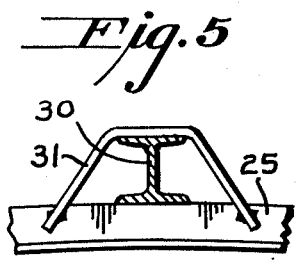
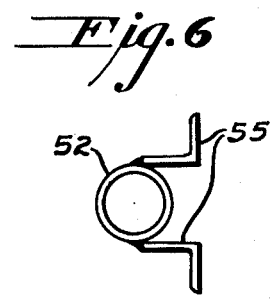
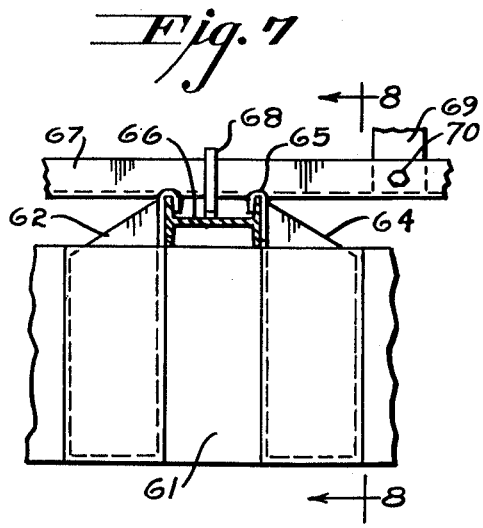
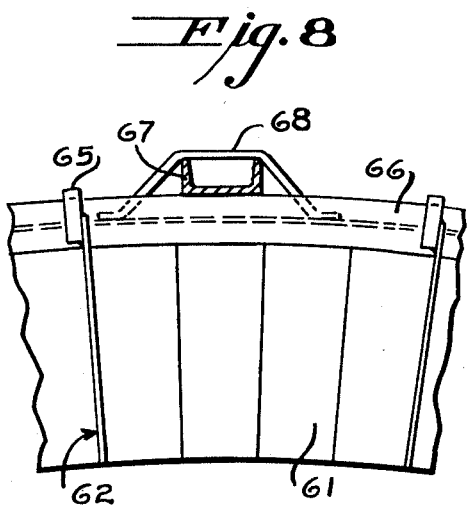
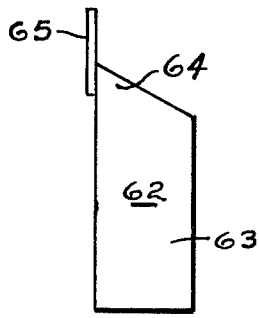
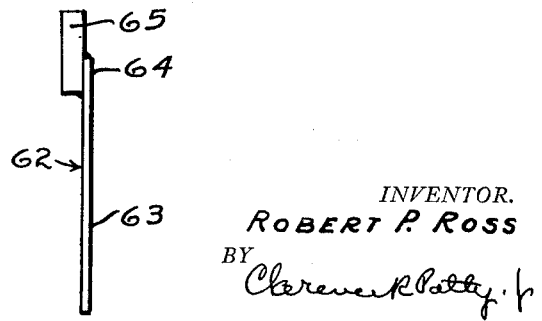
INVENTOR.
ROBERT P. ROSS
BY
ATTORNEY United States Patent Office 3,183,865
Patented May 18, 1965

3,183,865
REFRACTORY ARCH FURNACE ROOF
Robert P. Ross, Louisville, Ky., assignor to Corhart Refractories Company, Inc., Louisville, Ky., a corporation of Delaware
Filed Mar. 8, 1962, Ser. No. 178,298
8 Claims. (Cl. 110—99)

This invention relates to an improved stable refractory arch or roof for reverberatory furnaces, particularly open hearth steelmaking furnaces.

In the past, silica brick was most commonly used in the construction of sprung roofs on open hearth furnaces. One very desirable characteristic of a silica roof is that very little thermal expansion occurs above 1200° F. Thus, normal temperature changes during each heat and during cooling periods for repairs to various parts of the furnace caused very little movement in the roof and its contour remained fairly stable for the entire life of the silica refractory.

For more than a decade, more and more quantities of basic refractory brick have been used instead of silica brick because of the ability of the basic refractory to withstand higher temperatures than silica refractory. Silica brick is not capable of withstanding temperatures much in excess of about 3000° F. and care had to be taken to avoid overheating the roof. Moreover, with the advent of tonnage use of oxygen in the open hearth, silica brick could no longer be used because of the higher temperatures generated, in many cases exceeding 3300° F.

However, roofs of basic refractory are burdened with the dynamic effects caused by the characteristic thermal expansion of the material, which is nearly linear from room temperature to well above the furnace temperatures in the present-day tonnage oxygen practice. It has been found that simple sprung arches of basic refractory will not uniformly rise upon heating nor uniformly settle down upon cooling. They will sag very severely in certain areas and hump up excessively in adjacent areas. Moreover, the humps and sags occur unpredictably in many different areas in different roofs. In those areas where the refractory humps, the bricks are severely pinched together near the hottest face causing crumbling and spalling of the brick. Sagging areas tend to open the joints between individual bricks in a row at the hot face allowing any thermally spalled portions of the bricks to drop out, which portions would otherwise be held in place by proper contact with adjacent bricks. Ultimately roof failure occurs in the collapse of a portion of the roof much too large to be patched and long before the refractory would have otherwise been deteriorated by hot corrosive environment and thermal cycling conditions, such as is found in the open hearth.

When one or more rows of brick lose their contour, an imbalance in lateral thrust forces is generated along the rows. This results from the fact that the sagged portions form a low, or flat, arch and the humped portions form a high arch. It is a demonstrable fact that low arches have a much greater lateral thrust along the rows than high arches. Thus the higher thrust forces of the sagged portion of the rows cause further humping distortion and as the humping increases, it allows the sagged portions to further sag with a resultant increase of lateral thrust forces in the latter area. Hence, this shifting process is accelerated as shifting progresses until ultimate failure or collapse occurs. This shifting is fundamentally caused by the dynamic nature of a refractory, when used in an arched roof of a furnace having varying internal temperatures, that has a substantially linear positive coefficient of thermal expansion over the range of temperatures to which it is subjected.

Originally the basic refractory bricks were made simply by compacting and sintering granular material, such as magnesite or mixtures of magnesite and chrome ore, with or without additional constituents to effect improved chemical bonding upon sintering. These bricks have relatively low strength and are not able to withstand any substantial degree of pinching loads caused by humping and sagging.

Some improvement in roof life was attained by encasing the chemically bonded brick, which acted to provide greater strength to the inherently low strength sintered material. Further improvement was attained by additionally embedding a metal plate within the refractory block. The casing and internal plates not only increase the strength, but they tend to hold spalled segments of the brick together. However, these techniques do not control the humping and sagging movements, but merely resist higher pinching loads before the brick are forced out of proper position to such a degree that the roof collapses at that point.

The erratic humping and sagging behavior of these basic roofs lead to the widespread opinion that it was necessary to suspend as many of the individual bricks as possible. However, this does not prevent humping and requires more expensive bricks adapted for suspension.

In recent years, reasonably successful contour control systems have been developed for chemically bonded basic brick that greatly increase roof life, for example, from about 100 heats to 300 or more heats in open hearth furnaces not using tonnage oxygen. The systems basically comprise a combination of hold-down and hold-up effects. The hold-down effect amounts to rigidly blocking down of a new cold roof by means of a plurality of jacks or steel beams attached to the furnace overhead structure or binding. These jacks or beams rigidly hold a series of spaced-apart transversely-extending beams against the top of the longitudinally-extending, arcuate rows of brick comprising the roof. The hold-up effect is attained by vertically disposed, longitudinally-extending, steel plates placed between adjacent arcuate rows of brick, which plates extend from the hot face of the roof to well above the cold face. These plates are rigidly suspended either from the overhead binding or from interconnection with the transversely-extending beams. The net effect of the above described systems is to hold and stably maintain the original roof contour.

At least two major factors appear to contribute to the success of these systems. The first is the capability of these chemically bonded refractory roofs to be rigidly blocked down and absorb the thermal expansion effects without any contour distortion occurring between the points of hold-down. The second is the high degree of bonding between the vertically-extending plates and the adjacent arcuate rows of brick.

The first factor seems to be attributable, at least in part, to the relatively low hot strength of the refractory, or more significantly to the corresponding ability of the refractory to be plastically deformed at furnace temperatures.

The second factor seems to be attributable mainly to ability of the plates and bricks to fuse together, although frictional or mechanical bonding may also contribute to the bonding. Where a portion of the brick rows are not adjacent to vertically-disposed plates, these latter rows bond equally well to those brick rows which are adjacent the plates. Hence, all the rows of brick are held up and have their contour controlled, directly or indirectly, by these plates.

During the past decade, a new type of basic brick for furnace arches has been proposed and has been utilized in open hearth furnace roofs. This basic refractory is commonly referred to as "fused cast" or "heat-cast" by virtue of the fact that the refractory oxide materials used to make the brick are melted and then cast into preformed molds to solidify into appropriate shapes. Exemplary of this type of basic refractory are those disclosed in U.S. Patents 2,599,566 and 2,690,974 to R. J. Magri, Jr.

This fused cast type of basic refractory is ideally suited for furnace roofs, such as in open hearth furnaces, since it has an inherently superior resistance to deterioration caused by hot ferruginous slags and slag vapors as contrasted with chemically bonded basic refractory. Moreover, the fused cast refractory possesses a much higher hot strength than the chemically bonded refractory. However, like the chemically bonded basic brick, the fused cast basic brick possess essentially the same thermal expansion characteristics and suffer the same detriment of humping and sagging in a simple sprung arch roof.

In attempts to improve roof life and control the contour of fused cast basic refractory roofs, the aforementioned contour control systems, that were successful for chemically bonded brick, were adapted for use with the fused cast basic brick. Unfortunately, these attempts were far from successful, averaging at best only 200–250 heats before collapse of the roof in open hearth furnaces not using tonnage oxygen.

The lack of success with the prior art systems in constructing fused cast basic refractory arches is due to three important characteristics peculiar to this refractory. One of these is that the refractory is not plastic at ordinary open hearth furnace temperatures, by virtue of its much higher hot strength. The second important characteristic is the relatively wide variation in dimensions of the brick, as contrasted with chemically bonded brick. This variation in dimension inheres from the manufacturing process wherein a billet of refractory is cast and then sawed into brick of required size and shape. The resulting cast and sawed dimensions cannot be economically held as uniform for every brick as can be done for the less costly chemically bonded brick. The third characteristic is that only very limited chemical bonding or fusing reaction takes place between oxidized steel plates and the fused cast refractory.

As a result of the lower plasticity and higher strength of the fused cast brick, a rigidly held down roof of this brick is unable to absorb the thermal expansion effects without hazard of damages to the furnace structure. The tremendous humping forces, caused by high hot load strength and loss of contour, bent the transversely-extending beams upward in some cases and caused the roof to rupture out upwardly between the beams in other cases.

The dimensional variation characteristic of the fused cast brick and the characteristic limited reaction between iron oxide and fused cast refractory apparently caused the almost complete lack of bonding to the vertically-disposed plates that was found to exist. Hence, these plates exerted no contour control. When the humping occurred in one portion of an arcuate brick row, another portion of that row was allowed to sag. Moreover, the plates were found in most instances to be burned out to within 1″ of the cold face of the roof in contrast to chemically bonded brick arches where the usual burn-out of the plate is not much more than 1″ to 2″ from the hot face.

It was notable in all the fused cast refractory roofs utilizing the prior art systems that the remaining portions of the roof, which maintained their contour, still had from 50% to 90% of the original thickness or usable life left, it being understood that usable life will extend to a minimum thickness not substantially smaller than 2 inches.

It has now been discovered that the foregoing problems associated with fused cast refractory roofs can be overcome by a unique roof construction that provides means to maintain substantially the original arch contour, without humping and sagging, throughout substantially the full useful life of the refractory. This construction provides for a dual effect found essential for successful contour control of fused cast refractory roofs. A combination means provides a hold-up and hold-down on the refractory roof while simultaneously allowing a limited amount of upward and downward movement of the arched brick rows. The net effect is that the original smooth contour of the arch is continuously maintained while simultaneously allowing the thermal expansion effects of the fused cast refractory to be absorbed by rise and fall of the brick rows with changes in temperature. It should be understood here that what is meant by "upward movement of the brick rows" and by "rise of the brick rows," in this specification and the appended claims, is that the lateral expansion of the brick occurring when the brick is heated causes an increase in arc length of the arch and, since the brick rows have their ends rigidly positioned at fixed points, i.e. fixed skewbacks, the brick nearest the crown of the arch will rise the most with the amount of rise being substantially uniformly lesser and lesser for each brick further away from the crown down to the point where there is substantially no rise in the brick adjacent the fixed skewbacks. Likewise, the meaning of "downward movement of the brick rows" and of "fall of the brick rows" is the same as the above, but in the reverse direction or sense. Hence, each brick does not rise and fall the same distance as every other brick. Although there will be some change in the radius of curvature in the arch with this rise and fall of the brick rows, the original smooth contour of the arch is substantially the same at all times during the useful life of the roof.

The limits of upward and downward movement of the brick rows are the points where rigid hold-down and hold-up, respectively, are effected. For continuously effective contour control in this arrangement, the limited movement allowance is required to be substantially equal to the rise and fall of said brick rows, while having their original smooth arch contour substantially maintained, resulting solely from thermal expansion and contraction of the brick caused by changes in furnace operating temperatures. Thus, for any particular furnace process, the allowance can be determined from the known operating temperature range for the process, the known coefficient of thermal expansion for the particular refractory used and the span or arch length of the roof.

It is thus a principal object of this invention to provide a fused cast refractory arched furnaced roof construction having means to control and maintain the smooth contour of the arch during furnace operations for substantially the full usable life of the refractory, whereby sections that tend to sag ar held up and sections that tend to hump are held down.

It is another object of this invention to provide a refractory arched furnace roof construction having means to allow a limited amount of upward and downward movement of the arched brick rows, while maintaining substantially their original smooth arch contour, substantially equal to the rise and fall of said brick rows resulting solely from thermal expansion and contraction of said brick caused by changes in their temperature.

Additional objects, features and advantages of the present invention will become apparent, to those skilled in the art, from the following detailed description and the attached drawings, in which, by way of example, preferred embodiments of this invention are illustrated.

In the drawings, FIGURE 1 is a sectional, elevation view of a furnace roof construction of the invention taken longitudinally of the span of the arch;

FIGURE 2 is a sectional view of line 2—2 of FIGURE 1;

FIGURE 3 is a sectional view on line 3—3 of FIGURE 2;

FIGURE 4 is a sectional view showing a modification of the interconnection of the inverted T-beams and I-beam of FIGURE 2;

FIGURE 5 is a sectional view on line 5—5 of FIGURE 4;

FIGURE 6 is a plan view of the sleeve and mounting brackets of the sleeve jack shown in FIGURE 2;

FIGURE 7 is a sectional view corresponding to a portion of FIGURE 2 but showing a modification thereof;

FIGURE 8 is a sectional view on line 8—8 of FIGURE 7; and

FIGURES 9a and 9b are a front view and side view, respectively, of a brick clip employed in FIGURES 7 and 8.

Referring particularly to FIGURE 1, there is shown one embodiment of this invention for a roof construction having a chord length of approximately 23 feet. This construction is provided with a transversely spaced-apart series of overhead, furnace support or binding, structural members 10 rigidly secured to and supported from upright end members or buckstays 11, which form a framework for the furnace refractory sidewalls 12 and the fixed skewbacks 13. Additional support is provided to binding channels 10 by the two spaced-apart, tranversely-extending cross channel members 15, which are rigidly secured to channels 10.

While the skewback 13 illustrated here is of a steel construction configuration, it may be made in any other conventional manner and of other conventional materials, such as wedge-shaped refractory. In this specification and in the appended claims, the terms "fixed skewbacks" mean spaced-apart, opposed skewbacks having the distance between them maintained substantially constant at all times, which includes the non-adjustable, rigidly placed type skewback conventional in the United States as well as the adjustable type skewback in common use in Europe, provided that in the latter case no adjustment is made after construction of the roof has begun and for the entire life of the roof.

The refractory arch is conventionally constructed of somewhat key-shaped longer rib-forming brick 20 and shorter valley-forming brick 21 (see FIGURE 2) arranged in a series of alternating, arch-shaped rows of each size brick extending longitudinally of the span of the roof between the fixed skewbacks 13. The bottom or hot faces of all the brick are arranged substantially flush along the arc line of the roof span thereby forming the conventional rib and valley arrangement on the top side or cold face of the refractory arch by virtue of the longer rib-forming brick 20 extending upward beyond the valley-forming brick 21. It should be understood, however, that the well-known drop sections can be used if furnace roof wear is unbalanced.

Adjacent brick rows are laid tightly together so that the hold-up and hold-down effect and the limited vertical movement effect acting directly on the rib-forming brick 20 (as described below) will act indirectly on the valley-forming brick 21 through frictional contact and partial bonding that may occur between the two brick rows. If desired, a conventional grout joint can be made, using well-known refractory cements, between the adjacent brick rows to assist in this regard. However, it has been found that frictional and bonding forces between adjacent rows are insufficient to indirectly control the contour of valley-forming brick rows when five valley rows are disposed between pairs of consecutively spaced rib rows. Thus, it is essential that not more than four rows of valley-forming brick be used between pairs of consecutively spaced rib rows in this embodiment and particularly desirable results are obtained by using two or three valley rows between rib rows.

In other words, at least every fifth brick row must have the unique dual effect means of this invention acting directly on it, as will be described below.

Referring now to FIGURES 1–5, longiudinal steel beam supports 25 extend along substantially the entire length of and on the cold face of each row of rib-forming brick 20. Longitudinal supports 25 have a complementary arcuate configuration to the cold face of the rib rows and may be made of one continuous length or in segments. Preferably, supports 25 consist of two or more segments of a length convenient to handle on each brick row and have adjacent ends substantially near the crown of the arch as indicated at 26 (see FIGURES 1 and 3). Substantially every rib-forming brick 20 is interconnected with the longitudinal support 25 on its cold face, preferably by means of stainless steel hangers or wires 27. In the embodiment shown in the drawings, the upward extending portions of the rib-forming bricks have a hole 28 drilled through them transversely of the rib brick row. The wires 27 pass through holes 28 and the free ends of the wires 27 are wrapped over the support 25 and twisted together as indicated at 29. If desired, the holes 28 need not be drilled all the way through the brick, but rather an aperture, notch or shallow hole can be drilled part way into each side of the upward extending portion of the rib-forming brick 20 on the opposite sides adjacent the valley-forming brick 21. In this latter case, stainless steel hangers can be made of rod, wrought or cast, formed into a tongs-like clip that can be fitted over the supports 25 and its free ends inserted into the apertures, notches or shallow holes on opposite sides of each brick 20. While the foregoing interconnection methods are deemed to be the best mode known at present, other suitable methods that will be apparent to those skilled in the art can be used if desired.

Arranged over the longitudinal beams 25 and extending transversely of the roof span is a series of spaced-apart, substantially parallel, transverse steel beam supports 30. The transverse supports 30 are desirable for economic reasons, explained more fully below, but they can be omitted if desired. Transverse supports 30 are held down against and interconnected to longitudinal supports 25 at the points where the former cross over the latter. This interconnection can be accomplished by means such as steel straps 31, whose free ends are welded to the side of the web of inverted, arch-shaped T-beams 25, or by other suitable means.

While the illustrated embodiment in FIGURE 1 shows seven transverse beams 30 substantially equally spaced over a refractory arch having a chord length of about 23 feet, more or less than this number can be used. As a general rule it is found best to use at least one beam 30 for about every 4 feet of arch chord length. Also, where space between the transverse beams 30 nearest the crown of the arch and the furnace binding member 10 is extremely limited, a portion of the web of T-beams 25 can be cut out (indicated at 32 in FIGURES 1 and 3) at points where the transverse beams 30 nearest the crown of the arch cross over the T-beams 25. At these points 32, the beam 30 is held down against the remaining web portion of the T-beams 25.

An additional, but optional, advantageous feature is to rigidly block down the extreme ends of the longitudinal beams 25 by means of steel bars 39 attached to the upper portion of skewbacks 13 (see FIGURE 1).

The limited amount of upward and downward movement, or "breathing action," of the refractory arch is provided by the vertical movement control means 41, 42, 43, 44, 45, 46 and 47, which are shown as sleeve jacks in FIGURES 1 and 2. The sleeve jacks comprise a tubular or pipe member 51 slidably positioned within sleeve 52 and extending beyond both ends of sleeve 52. The lower end of pipe 51 is rigidly secured to transverse beam 30 by means of bolt 53 and angle iron brackets 54, the latter being rigidly attached to beam 30, such as by welding, bolting, etc. The sleeve 52 is rigidly secured to the furnace binding structural member 10 by means of mounting brackets 55 (see FIGURES 2 and 6). One leg of each mounting bracket 55 is welded to sleeve 52 and the other leg is rigidly secured to member 10, such as by welding, bolting, etc. In order to facilitate easier positioning of sleeve jacks 41 and 47 along the outermost portions of the roof span, sleeves 52 can be bracketed to steel structural plates 60 (see FIGURE 1), the latter being attached to binding channels 10 and buckstays 11.

A series of sleeve jacks are spaced along each transverse beam 30. A spacing found suitable is about one jack for every three or four rib rows. Thus, the effect of each jack is distributed to several longitudinal beams 25 through the transverse beam 30. However, if it is desired to omit the transverse beams 30, it will be necessary to use more jacks spaced closer together, preferably jacks on each rib row, with the lower ends of pipes 51 suitably secured directly to longitudinal beams 25.

The required limited movement allowance is provided by vertical movement limiting means, stop means or bolts 57 and 58 positioned through holes in pipe 51 above and below the sleeve 52. Thus, bolt 57 will limit the downward traverse of pipe 51 when bolt 57 contacts the upper end of sleeve 52. Likewise, bolt 58 will limit the upward traverse of pipe 51 when bolt 58 contacts the lower end of sleeve 52.

In constructing the roof according to this invention, bolts 57 and 58 are positioned appropriate predetermined distances X and Y, respectively (see FIGURE 2), for the particular refractory composition used. By way of illustration, an open hearth furnace roof was constructed according to FIGURES 1–6 using fused cast refractory brick having the following approximate composition in weight percent: 59% Mgo, 19% $Cr_2O_3$, 9% $Al_2O_3$, 10% FeO, 2% $SiO_2$ and 1% CaO. The rib-forming brick were 16½ inches long and the valley-forming brick were 13½ inches long. The arch was constructed on a radius of curvature of about 21 feet with an expansion allowance on the hot face of about 0.7% per foot of arch length. The X and Y allowance values determined for each sleeve jack with the roof initially cold and found suitable in conventional open hearth practice were as follows (in inches):

| Jack No. | 41 | 42 | 43 | 44 | 45 | 46 | 47 |
|---|---|---|---|---|---|---|---|
| X | ½ | 1½ | 2 | 2½ | 2 | 1½ | ½ |
| Y | ½ | 1½ | 2½ | 3½ | 2½ | 1½ | ½ |

The higher Y values for some of the jacks reflect an allowance for the initial expansion rise upon heating the furnace up to the normal starting temperature for each heat of steel (i.e. about 2300° F.).

FIGURES 7–9 show a modified embodiment of the invention suitable for constructing a roof with all brick of the same length. Brick 61 are laid in arch-shaped rows as in the previous example according to conventional practice, but stainless steel brick clips 62 are inserted between brick 61 at intervals along a pair of brick rows spaced from each other by one brick row between the pair. Each brick clip 62 comprises a body portion 63 that is disposed between brick 61, an upper extension 64 of the body portion 63 that extends upwardly from the cold face of brick 61 and a tab 65 joined to the upper extension 64 at a right angle.

Longitudinal support beams 66 extend along and on the cold face of the brick row between the pair of rows containing the brick clips 62. These beams 66 correspond to beams 25 in the previous example. Tabs 65 of the clips 62 are bent over to form a hanger-engaging relationship with beams 66 (see FIGURE 7). Transverse support beams 67, corresponding to beams 30 in the previous example, are arranged over longitudinal beams 66 in spaced-apart, substantially parallel relationship. Steel straps 68 hold down transverse beams 67 against the longitudinal beams 66, similar to the interconnection formed by straps 31 above. The lower ends of sleeve jack pipe members 69 (corresponding to pipes 51 above) are secured to beams 67 by bolts 70, or other suitable means.

While sleeve jacks have been shown for providing the "breathing action" to the refractory arch, it should be understood that other suitable means can be employed, such as spring jacks known in the prior art and having appropriate limiting means to provide the necessary limited movement allowance described above.

Hanger wires 27 and brick clips 62 are preferably made of, but not necessarily restricted to, stainless steel grades commonly known in the prior art as American Iron and Steel Institute (A.I.S.I.) 300 and 400 series compositions.

Roof constructions made in accordance with this invention, particularly the embodiment of FIGURES 1–6, have shown highly superior stability and life in actual service performance. For example, in actual roof constructions on open hearth furnaces that utilized the more recent practice of tonnage oxygen lancing, three lasted for about 400 heats each, one lasted for about 450 heats and another one lasted for over 500 heats. The significance of the improved construction of this invention is even notable in conventional open hearth practice not utilizing tonnage oxygen lancing where a roof was found to last about 500 heats.

It should be understood that, although the roof construction of this invention was designed for and is essential to successful contour control of arches made of fused cast refractory, it can also be used for arches made of other types of refractory of high hot load strength if so desired.

Although the present invention has been described with respect to specific details of certain embodiments thereof, it is not intended that such details be limitations upon the scope of the invention except insofar as set forth in the following claims.

What is claimed is:
1. An arched furnace roof construction comprising:
   (a) a series of refractory brick rows extending in arch form between fixed skewbacks,
   (b) an overhead furnace supporting structure fixed against vertical movement and arranged above said series of rows,
   (c) vertical movement control means having fixed upper and lower stop means thereon and being rigidly attached to said overhead supporting structure and interconnected with at least every fifth brick row in said series, said vertical movement control means adapted to allow only a limited amount of upward and downward movement of said brick rows, while maintaining substantially their original smooth contour, substantially equal to the rise and fall of said brick rows resulting solely from thermal expansion and contraction of said brick caused by changes in their temperature due to operational heating and cooling of the furnace.
2. An arched furnace roof construction according to claim 1 wherein the brick is composed of fused cast refractory.
3. An arched furnace roof construction comprising:
   (a) a series of fused cast refractory brick rows in abutting relation and extending in arch form between fixed skewbacks,
   (b) a series of spaced-apart longitudinal support means extending longitudinally of the span of the roof along and on the cold face of said brick rows, and each longitudinal support means interconnected with at least every fifth brick row,
   (c) an overhead furnace supporting structure fixed against vertical movement and arranged above said series of longitudinal support means,
   (d) vertical movement control means having fixed upper and lower stop means thereon and being rigidly attached to said overhead supporting structure and interconnected with said longitudinal support means, said vertical movement control means adapted to allow only a limited amount of upward and downward movement of said brick rows, while maintaining substantially their original smooth contour, substantially equal to the rise and fall of said brick rows resulting solely from thermal expansion and contraction of said brick caused by changes in their temperature due to operational heating and cooling of the furnace.

4. An arched furnace roof construction comprising:
   (a) two sizes of fused cast refractory brick consisting of longer rib-forming brick extending upward beyond shorter valley-forming brick on the cold face of said roof,
   (b) said brick of each size arranged in a series of rows having the arch configuration of and extending longitudinally of the span of the roof between fixed skewbacks,
   (c) said rows of rib-forming brick spaced transversely of the span of the roof,
   (d) one to four of said rows of valley-forming brick being disposed between and in abutting relation to each pair of consecutively spaced rows of rib-forming brick,
   (e) longitudinal support means extending longitudinally of the span of the roof along and on the cold face of rib-forming brick rows, said longitudinal support means having a complementary arcuate configuration to the cold face of said rib-forming brick rows,
   (f) means interconnecting said longitudinal support means and said rib-forming brick rows,
   (g) an overhead furnace supporting structure fixed against vertical movement and arranged above said longitudinal support means,
   (h) vertical movement control means having fixed upper and lower stop means thereon and being rigidly attached to said overhead supporting structure and interconnected with said longitudinal support means, said vertical movement control means adapted to allow only a limited amount of upward and downward movement of said brick rows, while maintaining substantially their original smooth contour, substantially equal to the rise and fall of said brick rows resulting solely from thermal expansion and contraction of said brick caused by changes in their temperature due to operational heating and cooling of the furnace.

5. An arched furnace roof construction according to claim 4 including:
   (a) a series of substantially parallel transverse support means arranged over said longitudinal support means and spaced longitudinally of and extending transversely of the span of the roof, said transverse support means rigidly attached to said vertical movement control means, and
   (b) means interconnecting said transverse support means and said longitudinal support means.

6. An arched furnace roof construction comprising:
   (a) two sizes of fused cast refractory brick consisting of longer rib-forming brick having a portion extending upwardly beyond shorter valley-forming brick on the cold face of the roof, said upwardly extending portion of said rib-forming brick having an aperture in each of the opposite sides of the rib-forming brick adjacent the valley-forming brick,
   (b) said brick of each size arranged in a series of rows having the arch configuration of and extending longitudinally of the span of the roof between fixed skewbacks,
   (c) said rows of rib-forming brick spaced transversely of the span of the roof,
   (d) one to four of said rows of valley-forming brick being disposed between and in abutting relation to each pair of consecutively spaced rows of rib-forming brick,
   (e) longitudinal steel beams extending longitudinally of the span of said roof along and on the cold face of rib-forming brick rows, said longitudinal steel beams having a complementary arcuate configuration to the cold face of said rib-forming brick rows,
   (f) hangers engaging the apertures in said rib-forming brick and interconnecting said longitudinal steel beams and said rib-forming brick,
   (g) a series of substantially parallel transverse steel beams arranged over said longitudinal steel beams and spaced longitudinally of and extending transversely of the span of the roof,
   (h) straps interconnecting said transverse steel beams and said longitudinal steel beams at points where said transverse steel beams cross over said longitudinal steel beams,
   (i) an overhead furnace binding structure fixed against vertical movement and arranged above said transverse steel beams,
   (j) a plurality of vertically variable jacks arranged over and spaced along said transverse steel beams, the lower ends of said jacks rigidly attached to said transverse steel beams and the upper ends of said jacks rigidly attached to said furnace binding structure,
   (k) fixed upper and lower stop means on said jacks adapted to allow only a limited amount of upward and downward movement of said brick rows, while maintaining substantially their original smooth contour, substantially equal to the rise and fall of said brick rows resulting solely from thermal expansion and contraction of said brick caused by changes in their temperature due to operational heating and cooling of the furnace.

7. An arched furnace roof construction according to claim 6 having two to three rows of valley-forming brick disposed between and in abutting relation to each pair of consecutively spaced rows of rib-forming brick.

8. An arched furnace roof construction comprising:
   (a) a series of fused cast refractory brick rows in abutting relation and extending in arch form between fixed skewbacks,
   (b) longitudinal steel beams extending longitudinally of the span of the roof along and on the cold face of every fourth brick row, said longitudinal steel beams having a complementary arcuate configuration to said cold face of said brick rows,
   (c) plates disposed transversely between at least every fifth brick joint in the brick rows adjacent said every fourth brick row, said plates having a portion extending upwardly beyond the cold face of said brick and said portion interconnecting said longitudinal steel beams with said plates,
   (d) a series of substantially parallel transverse steel beams arranged over said longitudinal steel beams and spaced longitudinally of and extending transversely of the span of the roof,
   (e) straps interconnecting said transverse steel beams and said longitudinal steel beams at points where said transverse steel beams cross over said longitudinal steel beams,
   (f) an overhead furnace binding structure fixed against vertical movement and arranged above said transverse steel beams,
   (g) a plurality of vertically variable jacks arranged over and spaced along said transverse steel beams, the lower ends of said jacks rigidly attached to said transverse steel beams and the upper ends of said jacks rigidly attached to said furnace binding structure,
   (h) fixed upper and lower stop means on said jacks adapted to allow only a limited amount of upward and downward movement of said brick rows, while maintaining substantially their original smooth contour, substantially equal to the rise and fall of said brick rows resulting solely from thermal expansion and contraction of said brick caused by changes in their temperature due to operational heating and cooling of the furnace.

(References on following page)

References Cited by the Examiner

UNITED STATES PATENTS

| | | | |
|---|---|---|---|
| 1,130,345 | 3/15 | Stevens | 110—99 |
| 1,317,460 | 9/19 | Stevens. | |
| 2,222,978 | 11/40 | Kiren | 110—99 |
| 2,659,326 | 11/53 | Honig | 110—99 |
| 2,781,006 | 2/57 | Heuer | 110—99 |
| 3,005,424 | 10/61 | Heuer | 110—99 |
| 3,013,510 | 12/61 | Parker | 110—99 |
| 3,015,288 | 1/62 | Hosbein et al. | 110—99 |
| 3,104,631 | 9/63 | Copeland | 110—99 |

FOREIGN PATENTS

| | | |
|---|---|---|
| 213,428 | 2/61 | Austria. |
| 938,265 | 1/56 | Germany. |

JAMES W. WESTHAVER, *Primary Examiner.*

PERCY L. PATRICK, FREDERICK KETTERER,
*Examiners.*